(12) United States Patent
Dupassieux et al.

(10) Patent No.: US 9,321,970 B2
(45) Date of Patent: \*Apr. 26, 2016

(54) PRODUCTION OF PARAFFIN FUELS USING RENEWABLE MATERIALS BY A CONTINUOUS HYDROTREATMENT COMPRISING A PRE-TREATMENT STEP

(71) Applicant: IFP ENERGIES NOUVELLES, Rueil-Malmaison (FR)

(72) Inventors: Nathalie Dupassieux, Ayn (FR); Thierry Chapus, Lyons (FR)

(73) Assignee: IFP ENERGIES NOUVELLES, Rueil-Malmaison (FR)

( \* ) Notice: Subject to any disclaimer, the term of this patent is extended or adjusted under 35 U.S.C. 154(b) by 767 days.

This patent is subject to a terminal disclaimer.

(21) Appl. No.: 13/671,708

(22) Filed: Nov. 8, 2012

(65) Prior Publication Data

US 2013/0116490 A1    May 9, 2013

(30) Foreign Application Priority Data

Nov. 8, 2011 (FR) ...................................... 11 03411

(51) Int. Cl.
| | | |
|---|---|---|
| *C07C 1/00* | (2006.01) | |
| *C10G 1/00* | (2006.01) | |
| *C10G 3/00* | (2006.01) | |
| *C10G 45/00* | (2006.01) | |
| *C10G 45/58* | (2006.01) | |

(52) U.S. Cl.
CPC .. *C10G 3/54* (2013.01); *C10G 3/50* (2013.01); *C10G 45/00* (2013.01); *C10G 45/58* (2013.01); *C10G 2300/1011* (2013.01); *C10G 2300/1014* (2013.01); *C10G 2300/1018* (2013.01); *C10G 2300/1051* (2013.01); *C10G 2300/1055* (2013.01); *C10G 2300/4006* (2013.01); *C10G 2300/4081* (2013.01); *C10G 2400/04* (2013.01); *Y02E 50/30* (2013.01); *Y02P 30/20* (2015.11); *Y02T 50/678* (2013.01)

(58) Field of Classification Search
CPC ............... C10G 3/10; C07C 1/00; C07C 9/16
USPC .......................................... 585/240; 44/606
See application file for complete search history.

(56) References Cited

U.S. PATENT DOCUMENTS

| | | | |
|---|---|---|---|
| 6,346,286 B1 | 2/2002 | Council et al. | |
| 7,232,935 B2 | 6/2007 | Jakkula et al. | |
| 8,304,592 B2 * | 11/2012 | Luebke | ................. C10G 45/04 585/265 |
| 8,471,081 B2 * | 6/2013 | McCall | ..................... C07C 9/16 44/605 |

(Continued)

OTHER PUBLICATIONS

Search Report of FR 1103411 (May 7, 2012).

(Continued)

*Primary Examiner* — Nina Bhat
(74) *Attorney, Agent, or Firm* — Millen, White, Zelano and Branigan, P.C.

(57) ABSTRACT

A process for hydrotreatment of a feed from renewable sources such as vegetable oils for the production of paraffinic hydrocarbons comprising pre-treatment by crystallisation and/or precipitation allowing the elimination of insoluble inorganic impurities under hydrotreatment conditions. The flow of the total feed is divided up into a certain number of different, part flows equal to the number of catalytic zones in the reactor, and the different part flows are injected in the successive catalytic zones in increasing proportions to produce an effluent containing paraffinic hydrocarbons.

12 Claims, 1 Drawing Sheet

(56) References Cited

U.S. PATENT DOCUMENTS

| | | | |
|---|---|---|---|
| 8,742,183 B2* | 6/2014 | McCall | C10G 45/02 44/308 |
| 2008/0216391 A1* | 9/2008 | Cortright | C10G 3/45 44/307 |
| 2010/0133144 A1 | 6/2010 | Kokayeff et al. | |
| 2012/0209017 A1* | 8/2012 | Ouni | C07C 69/66 554/1 |
| 2013/0067801 A1* | 3/2013 | Nousiainen | C10G 45/60 44/306 |
| 2013/0158137 A1* | 6/2013 | Oldenburg | C07C 29/1518 518/702 |

OTHER PUBLICATIONS

G.R. List et al. "Steam-Refined Soybean Oil: II. Effect of Degumming Methods on Removal of Prooxidants and Phospholipids", Journal of the American Oil Chemists Society, vol. 55, No. 2 (1978) pp. 280-284.

* cited by examiner

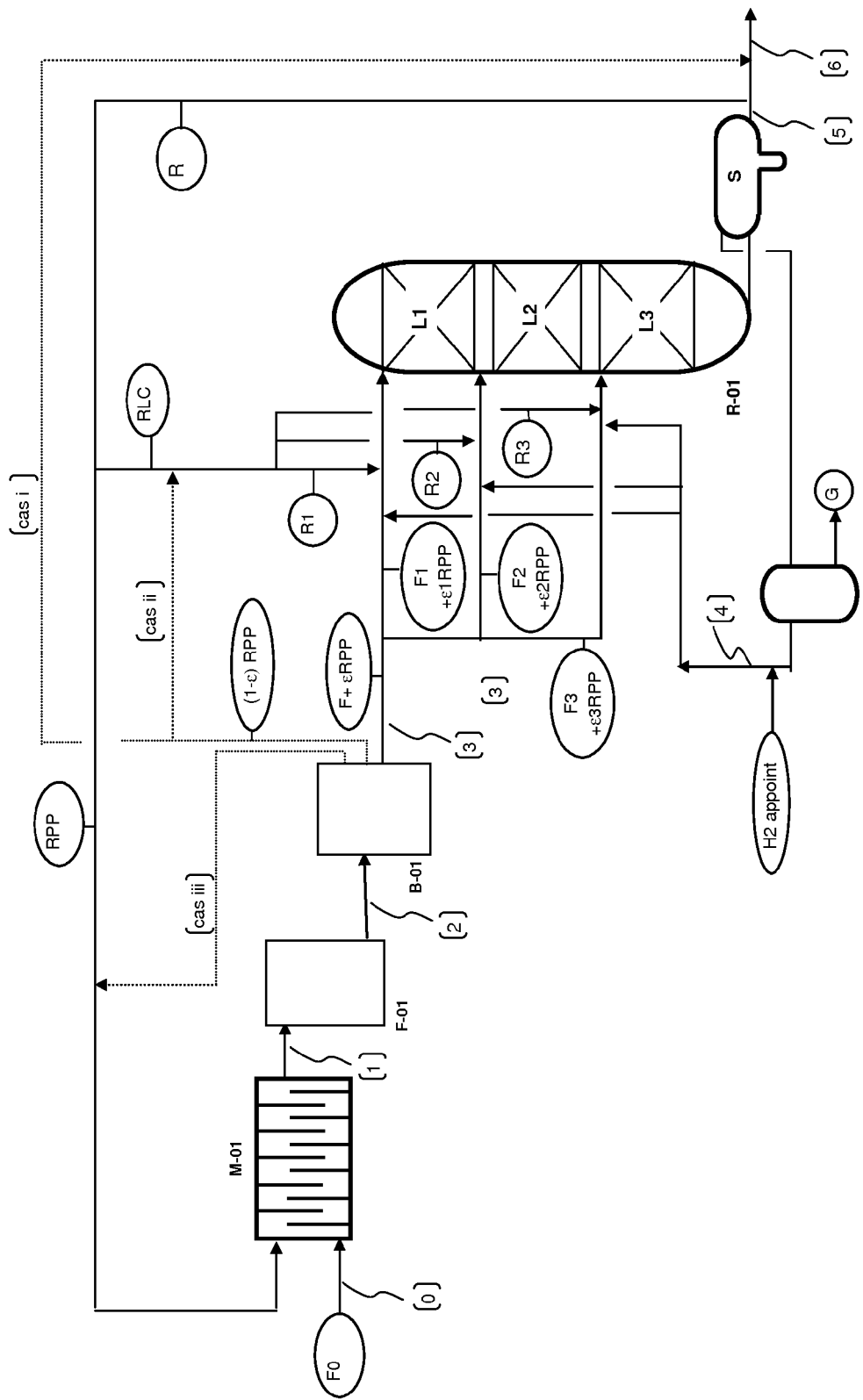

PRODUCTION OF PARAFFIN FUELS USING RENEWABLE MATERIALS BY A CONTINUOUS HYDROTREATMENT COMPRISING A PRE-TREATMENT STEP

The invention relates to a process for the production of paraffinic hydrocarbons that can be used as fuels by hydrotreatment of feeds from renewable sources such as oils and fats of vegetable or animal origin. In particular, the invention relates to a process for the production of paraffinic hydrocarbons by hydrotreatment of feeds from renewable sources, in which a thorough pre-treatment step, allowing the elimination of the inorganic impurities contained in said feeds, is incorporated upstream of the fixed bed hydrotreatment catalytic zones.

The present international context is characterised primarily by the rapid growth in the need for fuels, in particular those with gas oil and kerosene bases, and also by the scale of the problems associated with global warming and emissions of greenhouse gases. The result is a desire to reduce energy dependence upon raw materials of fossil origin and a reduction in $CO_2$ emissions. In this context, the search for new feeds from renewable sources represents a major challenge of increasing importance. Examples of such feeds include vegetable oils (of food- or non-food-grade) or those from algae and animals fats.

Such feeds are mainly comprised of triglycerides and free fatty acids, such molecules comprising hydrocarbon chains of fatty acids with a number of carbon atoms of between 4 and 24, and a number of unsaturated bonds generally of between 0 and 3, with higher levels for algae oils for example.

The very high molecular weight (>600 g/mol) of the triglycerides and the high viscosity of the feeds concerned means that use of these both directly or in a mixture in fuel bases presents difficulties for modern engines. However, the hydrocarbon chains constituting the triglycerides are essentially linear and their length (number of carbon atoms) is compatible with the hydrocarbons present in fuel bases.

It is thus necessary to convert such feeds to obtain fuel bases (including diesel and kerosene) of high quality that in particular are up to specification either directly or following mixing with other fractions from crude oil. Diesel must meet specification EN590 and kerosene must meet the requirements described in the International Air Transport Association (IATA) Guidance Material for Aviation Turbine Fuel Specifications based on ASTM D1655.

One possible approach is the catalytic conversion of triglycerides into deoxygenated paraffinic fuel in the presence of hydrogen (hydrotreatment).

During hydrotreatment the reactions which the feed containing the triglycerides undergoes are as follows:
the hydrogenation reaction of the unsaturated bonds of the hydrocarbon chains of the fatty acids of triglycerides and esters;
the deoxygenation reactions via the following two reaction pathways:
hydrodeoxygenation (HDO) leading to the formation of water by consumption of hydrogen and the formation of hydrocarbons with a carbon number ($C_n$) equal to that of the initial fatty acid chains;
decarboxylation/decarbonylation leading to the formation of carbon oxides (carbon monoxide and dioxide: CO and $CO_2$) and the formation of hydrocarbons containing one less carbon ($C_{n-1}$) than the initial fatty acid chains;
the hydrodenitrogenation (HDN) reactions, the term used to denote the reactions that allow removal of the nitrogen from the feed with the production of $NH_3$.

Hydrogenation of the unsaturated bonds of the hydrocarbon chains (carbon-carbon double bonds) is highly exothermic and the increase in temperature brought about by the release of heat can lead to temperature levels where the contribution of the decarboxylation reactions becomes significant. The hydrodeoxygenation reactions, including the decarboxylation reactions, are also exothermic reactions. Hydrodeoxygenation is generally favoured at a lower temperature over decarboxylation/decarbonylation. The hydrodenitrogenation reactions are more difficult and require higher temperatures than for hydrogenation and hydrodeoxygenation. Hydrodenitrogenation is generally necessary because the nitrogen compounds are generally inhibitors of hydroisomerisation catalysts which are optionally used following hydrotreatment. Hydroisomerisation allows an improvement in the properties in the cold state of the fuel bases following hydrotreatment, in particular when the production of kerosene is envisaged.

As a consequence, strict temperature control in the hydrotreatment section is necessary as an excessive temperature brings with it the disadvantages of favouring undesirable secondary reactions such as polymerisation, cracking, coke deposits and deactivation of the catalyst.

Furthermore, such feeds from renewable sources also contain significant quantities of impurities. These impurities can contain at least one inorganic element. Said impurities containing at least one inorganic element essentially comprise compounds containing phosphorous such as phospholipids which are emulsifying and surface-active agents which hamper the refining operations and which belong to the family of glyceridic compounds. Said impurities containing at least one inorganic element can also comprise alkaline-earth elements such as phospatidic acid salts or also metals, alkali metals, chlorophylls or transition elements in various forms.

Complex and polar phospholipids are amphiphilic molecules having one lipophilic apolar "head" comprising two fatty acids and one hydrophilic polar "head" based on the pairing of a phosphoric acid and a function of variable kind (amino-alcohol, polyol, etc). These impurities can also be organic. Said organic impurities essentially comprise nitrogen such as sphingolipids and various non-chelated chlorophylls.

In fact, said impurities containing at least one inorganic element, contained in said feeds are miscible in oil under hydrotreatment conditions. During the conversion of the triglycerides and/or fatty acids into paraffinic hydrocarbons, said impurities decompose and then their inorganic residues combine to form non-miscible salts which precipitate for example in the form of mixed phosphates of calcium and/or of magnesium of the type $Ca_xMg_y(PO_4)_z$, which are insoluble in the reaction medium. The precipitation of these salts causes an accumulation of inorganic solids in the catalytic bed and consequently an increase in the loss of pressure in the reactor, clogging of the catalytic bed and deactivation of the hydrotreatment catalyst through clogging of the pores. The cycle time is reduced by the presence of these impurities.

Moreover, the organic nitrogen impurities and the nitrogen impurities containing at least one inorganic element present in said feed are not totally eliminated during the hydrotreatment step. The result is a loss of performance of the optional hydroisomerisation step downstream.

The object of this invention is to address these disadvantages.

One object of this invention is to provide a hydrotreatment process for renewable feeds, allowing the promotion primarily of hydrodeoxygenation reactions by the formation of water while at the same time allowing:
efficient performance, by this same process, of the hydrodenitrogenation necessary to preserve the catalytic activity of the optional hydroisomerisation section and
limitation of the clogging of the catalytic bed(s) containing the hydrotreatment catalyst, deactivation of said catalyst and thus the loss of pressure associated with the accumulation of inorganic solids in the catalytic bed(s) through the use upstream of said catalytic beds, of a specific pre-treatment step allowing elimination of the inorganic impurities present in said feed.

Another object of this invention is to provide a hydrotreatment process for renewable feeds allowing the promotion primarily of hydrodeoxygenation reactions and thus maximisation of the hydrodeoxygenation yield whilst increasing the useful life of the catalytic hydrotreatment system through the elimination of the insoluble caking species.

Prior Art

Numerous documents from the prior art propose processes for the hydrotreatment of renewable feeds using an optional pre-treatment step upstream of the hydrotreatment.

Document US 2009/0318737 describes a process for producing fuels and in particular gas oil originating from renewable starting materials such as oils and fats of vegetable and animal origin. The process consists of treating a first portion of a renewable starting material by hydrogenation and deoxygenation in a first reaction zone and a second portion of a renewable starting material by hydrogenation and deoxygenation in a second reaction zone. A portion of the paraffinic hydrocarbon product obtained is recycled to the first reaction zone to increase the hydrogen solubility of the reaction mixture, using a ratio for the recycle to the first portion of renewable starting materials in the range 2 to 8 by volume (weight ratio in the range 1.7 to 6.9). The fact that the quantity of hydrogen in the liquid phase is maximized means that the degree of deactivation of the catalyst can be reduced, which means that the pressure can be reduced, decarboxylation/decarbonylation reactions can be promoted and hydrodeoxygenation reactions can be reduced, and thus the hydrogen consumption is reduced. No information is given regarding the quantity of nitrogen in the starting materials and the paraffinic effluents. The feed resulting from renewable starting materials can advantageously undergo a pre-treatment step in order to eliminate contaminants such as for example the alkali metals present in said feed. The pre-treatment step can consist of an ion exchange on a resin, acid washing, use of guard beds with or without demetallisation catalyst or solvent extraction and filtration.

Patent application EP 2 226 375 proposes a process for continuous hydrogenation of a feed originating from renewable sources containing triglycerides in a fixed bed reactor system containing a plurality of catalytic beds disposed in series and comprising a hydrogenation catalyst, using less recycle and as a result requiring limited transformation of existing units. The feed is introduced by staged injection so that the various catalytic beds receive more and more feed in the direction of flow. The recycled liquid is only added upstream of the first catalytic zone. This limitation to the quantity of product recycled to the reactor means that the total flow rate in the reactor, and thus the hydraulic load downstream of the reactor, can be limited. The preferred range for the total recycle for the fresh feed is less than 1, preferably less than 0.5 by weight. The ratio of diluent to fresh feed entering each catalytic bed is less than or equal to 4 by weight. The inlet temperature is identical for each bed.

Application EP 2 226 375 promotes the hydrodeoxygenation pathway by eliminating oxygen and forming water, rather than eliminating oxygen by decarboxylation reactions by means of controlling the inlet temperatures of the catalytic beds. Document EP 2 226 375 does not mention the problem of the presence of inorganic contaminants in said feed.

Patent application US 2009/0266743 describes a process for treatment of a feed containing triglycerides alone or in a mixture with a hydrocarbonated feed such as for example a middle distillate feed and in particular a gas oil feed. The treatment process consists of a thermal pre-treatment of said feed at a temperature of between 40 and 540° C., possibly in the presence of a gas such as hydrogen, nitrogen, helium, carbon monoxide and carbon dioxide, followed by a hydrotreatment to produce a gas oil type fuel.

The Applicant has observed that the quantity of nitrogen in the renewable starting material may vary considerably as a function of the origin of the material. In particular, the nitrogen content is generally higher in animal fats than in vegetable oils. Further, adjusting the temperature in the various catalytic zones of the hydrotreatment reactor to levels which are as low as possible in order to promote hydrodeoxygenation reactions leading to the formation of water may cause difficulties in obtaining low nitrogen content levels in the paraffinic fuel produced after hydrotreatment. Thus, it is well known that hydrodenitrogenation reactions (HDN) are more difficult to carry out than hydrodesulphurization reactions (HDS) or hydrodeoxygenation reactions (HDO), and as a result necessitate higher temperatures in order to reach the same level. Too high a level of nitrogen compounds in the paraffinic fuel produced by the hydrotreatment process results in poorer performance for the optional downstream hydroisomerization. Hydroisomerization (HIS) may be advantageous in order to produce diesel with improved cold flow properties and/or to produce kerosene satisfying freezing point specifications. In order to compensate for this effect, it would then be necessary to increase the severity of the HIS section, resulting in a lower yield for high value products such as diesel fuel and kerosene, and a reduced cycle, and as a result, an increase in operating costs.

The Applicant has thus implemented upstream of the catalytic bed(s) containing the hydrotreatment catalyst in such a way as to increase the useful life of said hydrotreatment catalyst, a thorough pre-treatment step of this feed allowing the elimination of the inorganic contaminants which are insoluble under hydrotreatment conditions, present in said feed. This pre-treatment step also allows reinforced elimination of the nitrogen compounds present in said feed by adsorption of specific nitrogen compounds.

Object of the Invention

Thus the aim of this invention is, then, through a combination of the introduction of the feeds in increasing proportions and a high recycle in the first zone and the implementation of a specific pre-treatment step using a portion of the recycle, to propose a hydrotreatment process for renewable feeds simultaneously making it possible to:
allow the elimination of the inorganic impurities, insoluble under hydrotreatment conditions, present in said feed,
promote primarily hydrodeoxygenation reactions by the formation of water;

effectively perform by this same process the hydrodenitrogenation necessary to preserve the catalytic activity of the optional hydroisomerisation section;

reinforce the elimination of nitrogen compounds and improve the useful life of the catalytic hydrotreatment system.

Thus, the present invention concerns a process for the hydrotreatment of a feed originating from renewable sources in order to produce paraffinic hydrocarbons in which hydrotreatment step c) is performed in the presence of hydrogen in excess of the theoretical hydrogen consumption and under hydrotreatment conditions in a fixed bed reactor having a plurality of catalytic zones disposed in series and comprising a hydrotreatment catalyst, characterized in that:

a) the total feed flow $F0$ is mixed with a flow RPP comprising at least a portion of the liquid fraction R containing paraffinic hydrocarbons from the separation step d), said mixture being heated to a temperature of between 130 and 320° C.;

b) said mixture is introduced into a pre-treatment zone in which the flow of said mixture takes place via a porous medium consisting of a particle bed referred to as a solid bed, said solid bed having a void fraction of between 0.25 and 0.8;

c) the effluent from the pre-treatment zone ($F+\epsilon RPP$), $\epsilon$ being between 0 and 1, is divided into at least a certain number of different part flows ($F1+\epsilon_1 RPP$) to ($Fn+\epsilon_n RPP$) equal to the number of catalytic zones n in the reactor, the first part flow ($F1+\epsilon_1 RPP$) is injected into the first catalytic zone, the second part flow ($F2+\epsilon_2 RPP$) is injected into the second catalytic zone and so on, if n greater than 2, the sum of the $\epsilon_i$ being equal to $\epsilon$;

the various part flows are injected into successive catalytic zones in increasing proportions such that $F1/F$ is less than or equal to $F2/F$, which itself is less than or equal to $F3/F$ and so on until $F(n-1)/F$ is less than or equal to $Fn/F$, in order to produce an effluent containing paraffinic hydrocarbons;

d) said effluent containing paraffinic hydrocarbons is subjected to at least one separation step allowing separation of at least one gaseous fraction and at least one liquid fraction containing the paraffinic hydrocarbons;

e) at least a portion R of said liquid fraction containing the paraffinic hydrocarbons from step b) is divided into at least a flow RLC and into said recycle flow RPP upstream of step a) and mixed with the total feed flow $F0$ and said flow RLC is divided into at least a certain number of different part flows R1-Rn less than or equal to the number of catalytic zones n in the reactor, said flows R1-Rn being recycled upstream of the catalytic zones 1-n, so that the weight ratio between the flow of paraffinic hydrocarbons ($R1+\epsilon_1 RPP$) sent to the first catalytic zone and the part flow F1 of the feed introduced into the first catalytic zone is greater than or equal to 10.

An advantage of the present invention is that it can be used to carry out hydrodenitrogenation and hydrodeoxygenation in the same catalytic zone without having recourse to a second, hydrodenitrogenation, reactor downstream. In fact, introducing the feed in increasing proportions coupled with a large recycle to the first zone means that, by means of an increasing temperature profile, a sufficiently hot zone can be obtained at the end of the catalytic zone to allow hydrodenitrogenation while keeping the temperature sufficiently low at the inlet to the catalytic zone to promote the hydrodeoxygenation reactions. Furthermore, the pre-treatment step employed upstream using the catalytic bed(s) containing hydrotreatment catalysts also allows reinforced elimination of the nitrogen compounds present in said feed by elimination of the impurities and in particular of specific nitrogen compounds such as amino-alcohols of the phosphatidylcholine, phosphatidylethanolamine and phosphatydylserine type, and the sphingolipids and chlorophylls.

Another advantage of the invention is that it limits the deactivation of said catalyst and the loss of pressure associated with the accumulation of inorganic solids in the catalytic bed(s) and thus the clogging of the catalytic beds containing the hydrotreatment catalyst by the employment upstream of said catalytic bed(s), said specific pre-treatment step allowing elimination of the inorganic contaminants present in said feed by precipitation/crystallisation and/or hot adsorptions.

A further advantage of the present invention consists of promoting the hydrodeoxygenation pathway by eliminating oxygen and forming water, rather than eliminating oxygen by decarboxylation reactions, by controlling the temperatures to keep them adapted to hydrodeoxygenation at the inlet to each catalytic zone. The advantages of this solution are an increase in the yield of paraffinic hydrocarbons and a reduction in the quantity of $CO/CO_2$ formed, which means that the inhibiting effect of CO on the activity of the hydrotreatment catalyst can be limited. Promoting the hydrodeoxygenation pathway also means that corrosion due to the presence of $CO_2$ in the reactor can be reduced.

A further advantage of the present invention is the limitation in the quantity of product recycled to the reactor, which allows the total flow in the reactor, and thus the hydraulic feed downstream of the reactor, to be limited.

Description

The process of the present invention consists of converting into paraffinic hydrocarbons, more precisely into middle distillates (kerosenes and/or gas oils), a wide range of feeds of renewable origin, essentially composed of triglycerides and fatty acids. These feeds are generally characterized by a high molar mass (usually more than 800 g/mole); the chains of the fatty acids of which they are composed contain in the range 4 to 24 carbon atoms, and generally in the range 0 to 3 unsaturated bonds per chain, with higher values possibly being obtained for certain specific feeds. Non-exhaustive examples of feeds which may be converted by the process of the present invention which may be cited are: vegetable oils such as rapeseed, jatropha, soya, palm kernel, sunflower, olive, coprah and camelina oils, fish oils or heterotrophic or autotrophic algal oils or animal fats such as beef suet, or residues from the paper industry (for example tall oil) or mixtures of these various feeds.

Preferably, the feeds derived from renewable sources are selected from oils and fats of vegetable or animal origin or mixtures of such feeds, containing triglycerides and/or free fatty acids and/or esters.

All of these feeds have high oxygen contents, and also significant quantities of impurities, in very variable quantities depending on the origin of the feeds, which may contain at least one inorganic element, and organic impurities contain essentially nitrogen as described above. Said feeds can generally have a content of inorganic compounds of between 0.1 and 2500 ppm. The quantities of nitrogen and sulphur are generally in the range 1 ppm to 100 ppm by weight approximately, preferably less than 100 ppm, depending on their nature. They may reach up to 1% by weight for particular feeds.

The feeds from renewable sources that are used in the process according to the invention can advantageously be in raw form, or may have undergone a refining step for edible oils known to a person skilled in the art such as for example a degumming or dephosphatation. Said feeds that have undergone at least said refining step are referred to as semi-refined and at the end of this treatment still contain up to 20 ppm of phosphorous, calcium, magnesium, iron and/or zinc, in the form of phospholipids.

The invention will now be described with reference to the figures in order to facilitate comprehension; the figures do not limit the general nature of the invention.

Pre-Treatment

The feed in raw state or possibly having undergone at least one refining step, also termed total fresh feed F0, is injected into the line (0) shown in FIG. 1.

According to step a) of the process according to the invention, the flow of total fresh feed F0 is mixed with a flow RPP constituted by at least a portion of the recycled liquid fraction R containing paraffinic hydrocarbons from separation step d).

In fact, according to the invention, at least a portion R of the liquid fraction containing the paraffinic hydrocarbons produced by the treatment process according to the invention and resulting from separation step d) is recycled and divided into at least a flow RLC, which is recycled upstream of the catalytic zones according to step e) of the process according to the invention and a flow RPP constituted by at least a portion of the liquid fraction R containing paraffinic hydrocarbons, recycled upstream of the pre-treatment zone.

The flow of the total fresh feed F0 is preferably mixed with said flow RPP in a device allowing two flows to come into contact and homogenous mixing of these flows.

In accordance with the invention, the mixture of the total fresh feed F0 and of said flow RPP is heated to a temperature of between 130 and 320° C., preferably of between 160 and 250° C. and most preferably between 160 and 220° C. Said mixture can advantageously be heated by the contribution of heat from the RPP flow. In the event that the heat contributed by the RPP flow is insufficient, said mixture is advantageously heated by any of the means known to a person skilled in the art such as for example passing through a heat exchanger, or an oven.

The proportion of the flow RPP introduced in step a) of the process according to the invention in relation to the total fresh feed flow F0 is such that the mass flow ratio RPP/F0 is advantageously of between 0.1 and 5, preferably between 0.5 and 3 and most preferably between 1 and 3.

According to step b) of the process according to the invention, said mixture is introduced, via the line (1) into a pre-treatment zone F-01 shown in the Figure, in which the flow of the mixture takes place through a porous medium consisting of a bed of particles termed a fixed bed, said fixed bed having a void fraction of between 0.25 and 0.8.

The particles that make up the bed preferably comprise materials with a specific surface of between 0.5 and 320 m²/g.

The materials that make up the particles of the bed are preferably selected from among the porous refractory oxides, advantageously selected from among alumina, silica, activated alumina, silica-aluminas, metal oxides and non-metal oxides. Said materials can advantageously also be selected from among the oxide ceramics, the non-oxide ceramics or the composite ceramics or materials such as silicon carbides, activated carbons, calcium aluminates, metals and graphite. In a highly preferred manner, said material is selected from among the porous refractory oxides.

In an even more preferable manner, said mixture is introduced into a pre-treatment zone in which the mixture flows through at least one fixed bed of particles of a porous refractory oxide free from catalytic metals selected from groups 6 and 8 to 12.

Said particles of the fixed bed used in the pre-treatment zone according to the present invention can advantageously be shaped and preferably in the form of spherical particles or oblong, cylindrical, hollow or solid, twisted cylinders, multilobes, for example with a number of lobes of between 2 and 5, or ring-shaped extrudates. Said particles are preferably in the form of spherical or extruded particles with a diameter of between 0.5 and 20 mm and preferably of between 0.5 and 10 mm.

Said particles of the fixed bed can advantageously have more specific geometrical forms in order to increase their void fraction. Said particles of the fixed bed can also advantageously have the following forms: hollow cylinders, hollow rings, Raschig rings, toothed hollow cylinders, crenelated hollow cylinders, cartwheels, Blend saddles, or multiple-hole cylinders.

Their external diameter advantageously varies between 1 and 35 mm.

Said particles of the fixed bed can advantageously be used alone or in a mixture.

It is particularly advantageous to superimpose different materials in at least two different fixed beds of varying height. It is also particularly advantageous to superimpose particles of different forms, the particles forming the fixed bed having the greatest void fraction being preferably used in the first fixed bed(s), at the inlet to the pre-treatment zone.

Where said materials are porous refractory oxides, the preferred porous refractory oxides have a macroporosity.

Said porous refractory oxides preferably have a macroporous volume, measured by mercury intrusion, that is to say a volume of pores whose average diameter is greater than 500 A, of more than 0.1 ml/g, and preferably of between 0.125 and 0.4 ml/g. Said porous refractory oxides also advantageously have a total porous volume of more than 0.60 ml/g, and preferably of between 0.625 and 1.5 ml/g and a specific surface expressed in $S_{BET}$ of advantageously between 30 m2/g and 320 m2/g.

During said pre-treatment step, of the raw or semi-refined feed, following heating of the mixture of the flow of total fresh feed F0 with said flow RPP under good conditions in terms of temperature, the decomposition is noted of the impurities containing at least one inorganic element then the recombination of their inorganic residues to form non-miscible salts which precipitate and are insoluble in the reaction medium. This precipitation is promoted because the impurities of a polar nature are less miscible in the feed/oil mixture with RPP paraffins added than in the oil alone. Concentrated at the interfaces between the oil-rich phase and the paraffin-rich phase and in contact with the porous medium of the pre-treatment step, preferably consisting of solids with a large contact area, the inorganic impurities precipitate at the surface of these. This solid precipitate which is non-miscible in the reaction medium deposits on the porous medium, again termed guard bed having the feature that said guard bed is used with a minimum activation temperature of the thermal crystallisation and/or precipitation reaction sought.

Said pre-treatment step, carried out upstream of the catalytic bed(s) containing the hydrotreatment catalysts thus allows the elimination of the inorganic impurities present in the feed.

Moreover, said pre-treatment step also allows the reinforcement of the elimination of the nitrogen compounds present in said feed and in particular the organic nitrogen impurities and the nitrogen impurities containing at least one inorganic element such as the amino-alcohols of the phosphatidylcholine, phosphatidylethanolamine or phosphatydylserine type, and the sphingolipids and chlorophylls. In fact, the presence of the porosity associated with the nature of the solid employed in the pre-treatment step, or the nature of the solids resulting from the crystallisation or precipitation of the inorganic impurities, also allows the adsorption of the nitrogen impurities such as the sphingolipids or the chlorophylls or any other residual nitrogen compound.

Said pre-treatment step b) preferably takes place in the absence of hydrogen.

Pre-treatment step b) preferably comprises in addition to the pre-treatment zone, a separation zone. In the case that said pre-treatment step d) comprises a separation zone, the effluent from the pre-treatment zone (F+εRPP) with ε of between 0 and 1 is then possibly introduced, via line (2) into a separation zone, B-01 shown in FIG. 1, in such a way as to separate a paraffin-rich effluent (1-ε) RPP. ε is preferably between 0.01 and 0.5.

Said paraffin-rich effluent (1-ε) RPP, preferably comprising at least 90% by weight of paraffins is advantageously separated. Said effluent (1-ε) RPP is either advantageously re-injected with the flow RLC in the catalytic zones according to case ii) shown in FIG. 1, or recycled upstream of the pre-treatment zone in a mixture with the RPP flow according to case iii) or sent back towards the flow of paraffins leaving the unit according to case i).

ε represents the fraction of the paraffinic flow RPP entrained with the feed F at the end of pre-treatment step b).

According to step c) of the process according to the invention, the effluent from the pre-treatment zone (F+εRPP) which may have undergone a step for separation of a paraffin-rich effluent, is divided into at least a certain number of different part flows (F1+$\epsilon_1$RPP) to (Fn+$\epsilon_n$RPP) equal to the number of catalytic zones n in the reactor, and the first part flow (F1+$\epsilon_1$RPP) is injected into the first catalytic zone, the second part flow (F2+$\epsilon_2$RPP) is injected into the second catalytic zone and so on, if n is greater than 2. The various part flows are injected into successive catalytic zones in increasing proportions such that F1/F is less than or equal to F2/F, which itself is less than or equal to F3/F and so on until F(n−1)/F is less than or equal to Fn/F, in order to produce an effluent containing paraffinic hydrocarbons.

The triglyceride-rich effluent (F+εRPP) coming from the pre-treatment zone is mixed via line (3) with a hydrogen-rich gas (4). Said hydrogen-rich gas can also contain other inert hydrocarbon compounds, that is to say which do not react as such with the constituents of the feed. The hydrogen can advantageously come from additional hydrogen and/or the recycling of the hydrogen-rich gas from the separation step employed downstream of the hydrotreatment step. In practice the added hydrogen can come from the steam reforming or from the conventional catalytic reforming possibly with added hydrogen from the steam reforming and light gases from separation step d), and its hydrogen purity is advantageously between 75 and 95% by volume, the other gases present generally being methane, ethane, propane and butane. The hydrogen-rich gas from the separation step employed downstream of the hydrotreatment step or also from the separation step employed after the optional hydroisomerisation step, preferably first undergoes one or more intermediate purification treatments before being recycled in the hydrotreatment and/or hydroisomerisation process.

According to one characteristic of the invention, the hydrogen used is in excess of the theoretical consumption, with the excess hydrogen representing at least 50% of this theoretical consumption, preferably between 75 and 400%, and more preferably between 100% and 300%, 150% being a typical value. The quantity of hydrogen used is controlled by the partial pressure of hydrogen.

BRIEF DESCRIPTION OF THE DRAWING

FIG. 1 represents a schematic of an embodiment of the invention.

The following definitions will now be given, to provide a better understanding of the present invention. They make reference to FIG. 1. The reactor comprises "n" catalytic zones. All of the flows are expressed as the flow rate by weight.

F0: total flow of the renewable feed treated in the process

F+εRPP: effluent from the pre-treatment zone

F1+$\epsilon_1$RPP+R1: part flow of the feed and part flow of recycle introduced into the first catalytic zone Z1

F2+$\epsilon_2$RPP+R2: part flow of the feed and part flow of recycle introduced into the second catalytic zone Z2

F3+$\epsilon_3$RPP+R3: part flow of the feed and part flow of recycle introduced into the third catalytic zone Z3 and so on . . .

Fn+$\epsilon_n$RPP+Rn: part flow of the feed and part flow of recycle Rn introduced into the final catalytic zone Zn R: total flow of recycle: recycled liquid fraction containing the paraffinic hydrocarbons from separation step d). R is divided into a flow RLC and a flow RPP.

RLC: recycle flow to the catalytic zone, constituted by at least a portion of the recycled liquid fraction R containing paraffinic hydrocarbons, recycled in at least the first catalytic zone Z1. RLC can be divided into various flows R1 to Rn depending on the number of catalytic zones to which it is sent.

RPP: flow constituted by at least a portion of the recycle liquid fraction R containing paraffinic hydrocarbons, recycled upstream of the pre-treatment zone.

The total recycle rate (RT) is defined as the weight ratio between the total flow of paraffins of the recycle sent to the catalytic zones Z1 to Zn and the total flow of the renewable feed sent to the catalytic zones Z1 to Zn after passing through pre-treatment zone (F):

In the configuration (case i), where (1-ε)RPP is returned towards the hydroisomerisation section:

$$RT=(RLC+\epsilon RPP)/F$$

In the configurations (case ii) and (case iii), where (1-ε) RPP is returned towards the hydrotreatment section:

$$RT=(RLC+RPP)/F=R/F$$

The total recycle rate (RT) is preferably less than 1.0, and more preferably less than 0.5, said flows being expressed as a flow rate by weight.

The local recycle rate towards the first catalytic zone (RF1) is defined as the weight ratio between the flow of paraffins of the recycle sent to the first catalytic zone Z1 that is to say (R1+$\epsilon_1$RPP) and the part flow of the feed introduced into the first catalytic zone 1 (F1):

$$RF1=(R1+\epsilon_1 RPP)/F1$$

Except during the process start-up phase, the diluting agent which is recycled at the level of the pre-treatment zone and at the level of the hydrotreatment catalytic zones Z1-Zn is constituted by a portion of the liquid hydrocarbon product leaving the hydrotreatment section. In the remainder of the present description, this diluting agent recycled to the inlet of at least one catalytic zone is also termed the total recycle flow R, and its delivery is denoted by R in the above definitions.

The hydrotreatment section of the process is designed to completely convert the treated feeds, and so the total recycle flow R produced is a flow of hydrocarbon which is free of oxygen, which means that its oxygen content is below the analytical detection limit and is essentially composed of paraffins. As a consequence, this total recycle flow is inert to hydrotreatment reactions and thus fulfils its role as diluent for the feed, meaning that the temperature rise in the catalytic zones is limited due to the exothermic nature of the reactions occurring therein. Nevertheless, for a given capacity, i.e. for a given mass flow rate of treated feed, denoted F0, the aim is to limit the quantity of liquid recycle injected into the catalytic zones, denoted RLC, in order to limit the total flow rate of the flow supplied to said catalytic zones. This means that hydrotreatment reactors with dimensions comparable to those of the reactors for hydrotreatment of oil cuts such as gas oils can be used (thereby limiting costs), that pressure drops can be limited and that reactor choking phenomena can be avoided. Furthermore, the pre-treatment zone employed upstream of the catalytic bed(s) containing the hydrotreatment catalyst also uses a flow RPP constituted by at least a portion of the liquid fraction R containing paraffinic hydrocarbons, inert, which allows acceleration of the phenomena by which inorganic impurities are eliminated by precipitation and/or adsorptions of the latter.

It has been discovered that it is advantageous to inject the feed into various catalytic zones (mass flow rate (F1+R1+$\epsilon_1$RPP) injected into zone Z1, F2+R2+$\epsilon_2$RPP into zone Z2, etc.) making sure thereby that increasing proportions of the feed are injected into the successive catalytic zones. This can be expressed as the following relationship:

F1/F less than or equal to F2/F, in turn less than or equal to F3/F, etc., and more generally F(n-1)/F less than or equal to Fn/F, for the general case in which n is the number of catalytic zones employed. The advantage of such a feed distribution in the various successive catalytic zones resides in the fact that the outlet temperatures for the various catalytic zones follow a rising profile, which means that sufficient temperatures can be obtained to reduce the residual quantities of nitrogen in the product leaving the various zones, not eliminated in the pre-treatment step, as much as possible, with the aim of retaining the catalytic activity of the downstream hydroisomerization section.

According to the invention, a flow R1 is recycled upstream of the first catalytic zone Z1 such that the weight ratio between the flow of paraffins (R1+$\epsilon_1$RPP) injected at the inlet to said first catalytic zone Z1 and the part flow F1 of feed introduced into Z1, is greater than or equal to 10.0, said flows being expressed as the mass flow. This ratio is also termed the local recycle (RF1) and is defined above. The use of such an arrangement of the flows of feed and of liquid recycle means:
  firstly, that a homogeneous temperature can be obtained in the entire section of the reactor at the outlet from zone Z1;
  secondly, that a sufficient temperature can be obtained at the outlet from zone Z1, meaning that hydrodenitrogenation reactions can be triggered and residual quantities of nitrogen in the liquid hydrocarbon produced at the outlet from zone Z1 can therefore be reduced;
  and that higher temperatures can be obtained at the outlet from the catalytic zones following zone Z1 (zones Z2 to Zn), which are sufficient to augment the nitrogen elimination percentages.

In fact, introducing the feed in increasing proportions coupled with a large local recycle to the first zone means that, by using an increasing profile of temperatures, a sufficiently hot zone is obtained at the end of the catalytic zone to allow hydrodenitrogenation while keeping the temperature sufficiently low at the inlet to the catalytic zone to promote hydrodeoxygenation reactions. The local recycle ratio of 10 or more means that relatively little feed is injected onto the first zone, thereby allowing the remainder of the feed to be injected into the successive catalytic zones in greater and increasing proportions. The increase in the quantity of feed injected into the successive zones means that an increasing profile of inlet and outlet temperatures can be obtained for the various zones.

The flows entering the second catalytic zone Z2 are thus as follows:
  at least part of the feed with added paraffins from the pre-treatment zone injected at the inlet of zone Z2 (F2+$\epsilon_2$RPP), such that the weight ratio F2/F is greater than the weight ratio F1/F;
  the recycle liquid R1 injected at the inlet of zone Z1, made up almost exclusively of paraffinic hydrocarbons and having passed through zone Z1;
  the effluent formed by the conversion of the feed in zone Z1, corresponding to the flow F1. The liquid hydrocarbons present in this effluent are free of oxygen and are almost exclusively paraffinic hydrocarbons;
  possibly the recycle liquid R2, made up almost exclusively of paraffinic hydrocarbons and constituted by at least a portion of the flow of recycle to the catalytic zone RLC.

During start-up phases, a wide range of hydrocarbons may be injected such as, for example, a light gas oil, until a sufficient quantity of paraffinic product is available for recycling to the inlet of at least one catalytic zone.

The feed is supplied via line (O), as seen in FIG. 1, while the hydrogen-rich gas is supplied via line (4). The feed is injected into the pre-treatment zone in a mixture with the flow of paraffins RPP from a portion of the recycle flow R from a portion of the paraffins produced at the outlet of the hydrotreatment. The flow F+$\epsilon$RPP from the pre-treatment zone is distributed into various flows F1+$\epsilon_1$RPP, F2+$\epsilon_2$RPP, ..., Fn+$\epsilon_1$RPP supplying the various successive catalytic zones. The hydrogen-rich gas (flow (4)) is distributed in the same number of flows H1, H2, Hn. The flow F1+$\epsilon_1$RPP is mixed with the gas flow (H1), the flow F2+$\epsilon_2$RPP is mixed with the gas flow (H$_2$), and so on to the n$^{th}$ catalytic zone.

The temperature of the flow at the outlet from pre-treatment F+$\epsilon$RPP can be adjusted in order to reach a temperature of less than 180° C., preferably of less than 120° C., and more preferably less than 80° C. It must be sufficient to allow a sufficient reduction in viscosity and thus adequate transfer from the storage tanks to the hydrotreatment reaction section. In the same manner, the temperature of the hydrogen-rich gas which is mixed with the feed is as low as possible while being compatible with the operation of the process, since it is advantageous for the process to mix the feed with the hydrogen at low temperature in order to reduce the temperature by a quench effect applied to hydrocarbon products leaving the various catalytic zones. In practice, since the temperature rises when compressing hydrogen-rich gas, the hydrogen is frequently cooled after compression. Preferably, the temperature of the hydrogen-rich gas is in the range 40° C. to 100° C., for example 50° C.

The temperature of the flow injected into the inlet to the catalytic zone Z1, that is to say the effluent from the pre-treatment zone (F1+$\epsilon_1$RPP) and of the recycle liquid R1 must be carefully regulated. The temperature of said flow injected at the inlet to the catalytic zone Z1 is preferably a minimum of 180° C., preferably 200° C. This allows the reaction series to be triggered: reactions for eliminating oxygen in accordance with a mechanism that results in the formation of water, or in accordance with a decarboxylation/decarbonylation mechanism resulting in the formation of $CO_2$ and CO, but also hydrodenitrogenation reactions in at least a portion of said catalytic zone. This inlet temperature may be adjusted as a function of the nature of the feed. Advantageously, the temperature at the outlet from the zone Z1 is more than 250° C. The volume of the catalyst employed in said catalytic zone is adapted so that the conversion, i.e. the degree of elimination of oxygen, is complete at the outlet from said zone Z1.

At the outlet from catalytic zone Z1, a second flow of feed $F2+\epsilon_2 RPP$ is added, which represents a larger proportion of feed than that injected at the inlet to zone Z1. This flow of feed is added to the flow of hydrogen—($H_2$) rich gas, and possibly the liquid recycle R2 constituted by at least a portion of the flow RLC which itself results from the liquid fraction R containing paraffinic hydrocarbons from the separation step d). The mixture is injected into the reaction zone, where it is mixed with the effluent from zone Z1. This allows a lowering of the temperature of the products formed at the outlet of zone Z1, and the temperature at the inlet to zone Z2 is thus generally higher than that at the inlet to zone Z1. The same categories of reaction occur in the zone Z2 and the zone Z1, with slightly faster kinetics in the zone Z2 due to the higher mean temperature.

The same principle applies in the successive catalytic zones, with the flow of pre-treated feed ($Fn+\epsilon_n RPP$) and possibly a flow of recycle Rn being added to the completely converted product formed in the previous catalytic zones.

As the feed is transformed into paraffinic hydrocarbons in a catalytic zone, the temperature increases in the zone, since hydrogenation and deoxygenation reactions are highly exothermic reactions. Thus, the temperature is sufficiently high towards the outlet of a catalytic zone to be able to carry out the hydrodenitrogenation reaction. The temperature at the outlet of at least one catalytic zone is preferably more than 300° C., more preferably more than 320° C.

The ratios between the hydrogen flows added to each of said flows (F1), . . . , (Fn), and the feed mass flow rates (F1), . . . , (Fn) are of the same order of magnitude for the series of catalytic zones, the ratio between the flow rate of hydrogen and the flow rate of feed being in the range 300 to 1500 $Nm^3/m^3$, preferably in the range 600 to 900 $Nm^3/m^3$.

Optionally, it is possible to inject a complementary liquid flow between the catalytic zones if it is felt that there is a need to further dilute the feed.

In a preferred variation, valves for regulating the part flows of feed and hydrogen may be controlled by the temperatures at the inlets and outlets for the catalytic zones so as to adjust the feed part flow and hydrogen flow as well as the liquid recycle flow R1 to Rn during operation. In this manner, the desired temperature at the inlet to the catalytic zones and in the catalytic zones is maintained. Similarly, the temperature may be controlled by varying the temperature of the feed ($F+\epsilon$ RPP) following pre-treatment and/or of the hydrogen injected and/or of the recycle in the reactor system.

The hydrotreatment reactor for the process according to the invention may contain a variable number n of catalytic zones. n is preferably between 3 and 10, preferably between 3 and 6. The term "catalytic zone" means a catalytic bed. Each catalytic zone may comprise one or more layers of catalysts, identical or different, optionally supplemented by inert layers. The catalytic zones may contain identical or different catalysts.

The type of catalyst used in the hydrotreatment section of this process is well known in the art.

Concerning active catalysts in the sulphide form, and treated unrefined feeds generally having limited sulphur contents (less than 100 ppm by weight in general, and usually less than 50 ppm by weight), it is sufficient to add a sulphur-containing compound such as dimethyldisulphide (DMDS) to the set of feed flows; under the temperature conditions in the hydrotreatment section, it decomposes into $H_2S$ and methane. This device means that the hydrotreatment catalysts used in the present process can be kept in their sulphide form and thus sufficient catalytic activity can be maintained throughout the cycle. Recommended injected DMDS contents are in the range 10 to 50 ppm by weight of sulphur equivalent with respect to the feed. In practice, adding DMDS corresponding to 50 ppm by weight sulphur of equivalent with respect to the feed is sufficient to retain the catalytic activity throughout the cycle.

The catalysts used in the hydrotreatment section of the process according to the invention may be an association of the catalysts described below.

The hydrotreatment catalyst is a sulphurized catalyst which comprises one or more elements from groups 6, 8, 9 and 10 of the periodic table of the elements, preferably nickel, molybdenum, tungsten and/or cobalt.

The hydrotreatment catalyst, preferably used in a fixed bed, is advantageously a hydrotreatment catalyst comprising a hydro-dehydrogenating function comprising at least one metal from group VIII and/or group VIB, used alone or as a mixture, and a support selected from the group formed by alumina, silica, silica-aluminas, magnesia, clays and mixtures of at least two of these minerals. Said support may also advantageously include other compounds, for example oxides selected from the group formed by boron oxide, zirconia, titanium oxide and phosphoric anhydride. The preferred support is an alumina support, highly preferably η, δ or γ alumina.

Said catalyst is advantageously a catalyst comprising metals from group VIII, preferably selected from nickel and cobalt, used alone or as a mixture, preferably in association with at least one metal from group VIB, preferably selected from molybdenum and tungsten, used alone or as a mixture. Preferably, a NiMo type catalyst is used.

The quantity of oxides of metals from group VIII, preferably nickel oxide, is advantageously in the range 0.5% to 10% by weight of nickel oxide (NiO), preferably in the range 1% to 5% by weight of nickel oxide, and the quantity of oxides of metals from group VIB, preferably molybdenum trioxide, is advantageously in the range 1% to 30% by weight of molybdenum oxide ($MoO_3$), preferably 5% to 25% by weight, the percentages being expressed as a % by weight with respect to the total catalyst mass.

The total quantity of oxides of metals from groups VIB and VIII in the catalyst used is advantageously in the range 5% to 40% by weight, preferably in the range 6% to 30% by weight with respect to the total catalyst mass.

The weight ratio, expressed as the metal oxide, of the metal (or metals) from group VIB to the metal (or metals) from group VIII is advantageously in the range 20 to 1, preferably in the range 10 to 2.

Said catalyst used in the hydrotreatment step of the process according to the invention must advantageously be characterized by a strong hydrogenating power in order to orientate the selectivity of the reaction as far as possible towards a hydrogenation which maintains the number of carbon atoms of the fatty chains, i.e. the hydrodeoxygenation pathway, in order to maximize the yield of hydrocarbons in the gas oil and/or kerosene distillation range. For this reason, it is preferable to operate at a relatively low temperature. Maximizing the hydrogenating function also means that polymerization and/ or condensation reactions leading to the formation of coke, which would degrade the stability of the catalytic performances, are limited.

Said catalyst used in the hydrotreatment step of the process according to the invention may also advantageously contain a doping element selected from phosphorus and boron, used alone or as a mixture. Said doping element may be introduced into the matrix or, as is preferable, be deposited on the support. It is also possible to deposit silicon onto the support, alone or with phosphorus and/or boron and/or fluorine.

The quantity by weight of the oxide of said doping element is advantageously less than 20%, preferably less than 10%, and it is advantageously at least 0.001% with respect to the total catalyst mass.

In a preferred variation, the catalysts used are like those described in patent application FR 2 943 071, describing catalysts with high selectivity for hydrodeoxygenation reactions.

According to another preferred variation, use is made of the catalysts as described in patent application EP 2 210 663 which deals with supported or bulk catalysts comprising an active phase consisting of a Group VIB sulphide, in which the Group VIB element is molybdenum.

The context of the present invention also encompasses the use, in the hydrotreatment step of the process according to the invention, simultaneously or successively, of a single catalyst or a plurality of different catalysts in the catalytic zones.

In the context of the invention, it is thus possible to maintain an overall conversion of the feed originating from a renewable source, i.e. a conversion by hydrodeoxygenation and decarboxylation/decarbonylation together, which is advantageously 90% or more; preferably, the overall conversion of the feed is equal to 100%, while maximizing the yield of hydrodeoxygenation product or the conversion by hydrodeoxygenation which, in accordance with the invention, remains at 50% or higher. In the case in which catalysts with a high selectivity for HDO (as described above) are used, the conversion by hydrodeoxygenation is 90% or higher, preferably 95% or higher and more preferably 96% or higher. In this case, the conversion by decarboxylation/decarbonylation or decomposition/decarbonylation product yield from the feed from renewable sources is advantageously limited to at most 10%, preferably limited to at most 5% and more preferably to at most 4%.

The hydrodeoxygenation reaction results in the formation of water by consuming hydrogen and forming hydrocarbons with the same number of carbon atoms as in the initial fatty acid chains. The effluent from the hydrodeoxygenation reactions comprises even-numbered hydrocarbons such as C14 to C24 hydrocarbons and are vastly in the majority compared with the odd-numbered hydrocarbons such as C15 to C23 obtained by decarboxylation/decarbonylation reactions. The selectivity for the hydrodeoxygenation pathway is demonstrated by measuring the total yield of hydrocarbons containing even numbers of carbon atoms and the total yield of hydrocarbons containing an odd number of carbon atoms in the liquid fraction which can be upgraded to fuel. The yields of even and odd numbered hydrocarbons providing access to the reaction selectivity (HDO/decarboxylation/decarbonylation) are obtained by gas chromatographic analysis of the liquid effluents from the reaction which can be upgraded to fuel. The gas chromatographic analysis technique is a method which is known to a person skilled in the art.

Unless otherwise indicated, the hydrotreatment process according to the invention is operated under hydrotreatment conditions which are generally known in the art, such as those described in patent EP 1 741 768. The total pressure is advantageously in the range 2 MPa to 15 MPa, and preferably in the range 5 MPa to 10 MPa.

According to the invention, the hydrogen is used in excess. In the process according to the invention, the ratio between the flow rate of hydrogen and the flow rate of unrefined feed is advantageously in the range 300 to 1500 $Nm^3/m^3$, preferably in the range 600 to 900 $Nm^3/m^3$.

A satisfactory operation of the process according to the invention results in an overall HSV (defined as the ratio between the total volume flow rate of the treated unrefined feed and the total volume of the catalyst in the hydrotreatment section) advantageously in the range 0.1 to 5.01 $h^{-1}$, preferably in the range 0.1 to 1.51 $h^{-1}$.

The temperatures used in the various zones of the hydrotreatment section have to be carefully controlled in order to avoid, as far as possible, unwanted reactions such as:
feed polymerization reactions, which lead to the deposition of coke and thus to deactivation of the catalyst;
decarboxylation/decarbonylation reactions, resulting in a loss of middle distillate yield;
and at the same time to carry out total conversion of the feed both as regards elimination of oxygen-containing compounds and as regards elimination of nitrogen-containing compounds. In general, the process according to the invention operates at a temperature in the range 200° C. to 400° C. Introducing the feed in increasing proportions coupled with a substantial recycle to the first catalytic zone means that an increasing temperature profile can be obtained at the inlet to the zones and also at the outlet from the zones.

The temperature at the inlet to zone Z1 must preferably be more than 180° C., preferably more than 200° C. The temperatures at the inlet to the subsequent catalytic zones must be higher than that at the inlet to the preceding zone, generally less than 300° C. and preferably less than 280° C.

The temperature at the outlet from at least one catalytic zone is preferably more than 300° C., preferably more than 320° C. The temperatures at the outlet from each of the catalytic zones must preferably be less than 400° C., more preferably less than 380° C., in order to limit deactivation of the catalyst by coking.

The process according to the invention uses fixed trickle bed reactors which are known to a person skilled in the art. The reagents (feed and hydrogen) are introduced into the reactor as a descending co-current flow from the top to the bottom of the reactor. Examples of such reactors are described in the document U.S. Pat. No. 7,070,745.

Between each catalytic zone, it is possible to inject supplemental hydrogen in order to profit from a quench effect and to obtain the desired temperatures at the inlet to the next catalytic zone. Thus, quench boxes may be installed between each catalytic zone in order to ensure optimum temperature homogeneity over the whole section of the reactor, and for all of the catalytic zones.

In the same manner, distributors may be installed between each catalytic zone in order to guarantee a homogeneous supply of the liquid feed over the whole section of the reactor, and for all of the catalytic zones.

One advantage of the process according to the invention consists in its great flexibility depending on the origin of the feed. Feeds which differ, in particular in the various degrees of unsaturation of the hydrocarbon chains, may be completely converted both as regards the elimination of oxygen (which leads to maximum efficiency of dilution of the unrefined feed in the next zone) and as regards the elimination of nitrogen (which leads to better function of the downstream hydroisomerization step).

Optionally, the process according to the invention may also convert feeds from renewable sources mixed with oil cuts such as gas oils, kerosenes, or even gasolines from oil refining processes. Preferably, the oil cuts are oil feeds of the middle distillate type selected from the group formed by straight run gas oils and/or kerosenes and gas oils and/or kerosenes from conversion processes, or any mixture thereof.

Preferably, the oil cuts are selected from the group formed by straight run atmospheric gas oils, gas oils from conversion processes such as those derived from coking, for example, from fixed bed hydroconversion (such as those from HYVAHL® processes which treat heavy feeds and was developed by the Applicant) or ebullated bed hydrotreatment processes for heavy feeds (such as those derived from H-OIL® processes) or solvent deasphalted oils (for example using propane, butane or pentane) from deasphalting straight run vacuum distillation residue, or residues derived from heavy feed conversion processes such as HYVAHL® or H-OIL®. The feeds may also advantageously be formed by mixing these various fractions. They may also advantageously contain light gas oil or kerosene cuts with a distillation profile from approximately 100° C. to approximately 370° C. They may also advantageously contain aromatic extracts and paraffins obtained in the context of the manufacture of lubricating oils.

In this case, the quantity of liquid recycle sent to the first catalytic zone of the hydrotreatment section may be greatly reduced or even dispensed with, since these flows of oil feeds then result from their treatment with hydrogen, with less heat being released than when feeds of renewable origin comprising substantial quantities of oxygen are used.

Separation

According to step d) of the process according to the invention, the effluent containing paraffinic hydrocarbons from the final catalytic zone of step c) is subjected to at least one separation step allowing the separation of at least a gaseous fraction and at least a liquid fraction containing the paraffinic hydrocarbons. The gaseous fraction contains hydrogen, CO, $CO_2$, l'$H_2S$ and light gases.

Said effluent containing paraffinic hydrocarbons from the final catalytic zone of step c) is drawn off in the line (5).

According to a first embodiment, separation step d) can be performed in a single step by a high-temperature, high-pressure separator (S) working without pressure reduction at a temperature of between 145° C. and 280° C.

According to a second embodiment, not shown in FIG. 1, separation step d) comprises a separation in two steps without pressure reduction, the first separation being carried out at between 145° C. and 280° C. in a high-temperature separator, and the second being carried out at between 25° C. and 100° C. in a low-temperature separator not shown in the Figure. In a preferred embodiment, the condensate of the fraction obtained from the second separation step is introduced into a degassing receptacle not shown in the Figure.

Preferably, said liquid fraction containing the paraffinic hydrocarbons from gas/liquid separation step d) then undergoes a separation of at least a portion, preferably all, of the remaining water which has been formed during the hydrodeoxygenation reactions (not shown in the Figure).

The aim of this step is to separate water from the liquid containing the paraffinic hydrocarbons. The term "elimination of water" means elimination of the water produced by the hydrodeoxygenation (HDO) reactions. The more or less complete elimination of water is advantageously a function of the tolerance to water of the hydroisomerization catalyst used in the optional subsequent step of the process according to the invention. The water may be eliminated using any method and technique which is known to a person skilled in the art, such as by drying, passage over a desiccant, flash, solvent extraction, distillation or decanting, for example, or by combining at least two of these methods.

Optionally, a final step for purification of the various pollutants may be carried out using methods which are known to a person skilled in the art, such as by steam stripping or nitrogen stripping or by coalescence and/or using a capture mass, for example.

According to step e) of the process according to the invention, at least one portion R of said liquid fraction containing the paraffinic hydrocarbons is divided into at least one flow RLC and into said recycle flow RPP upstream of step a) and mixed with the total feed flow F0 and said flow RLC is divided into at least a certain number of different, part flows R1 to Rn less than or equal to the number n of catalytic zones in the reactor, said flows R1 to Rn being recycled upstream of the catalytic zones 1 to n, such that the weight ratio between the flow of paraffinic hydrocarbons (R1+∈1RPP) sent into the first catalytic zone and the part flow F1 of the feed introduced into the first catalytic zone is greater than or equal to 10.

The proportion of the flow RPP introduced in step a) of the process according to the invention in relation to the total recycle flow R is such that the mass flow ratio RPP/R is advantageously of between 0.1 and 0.9 and preferably between 0.15 and 0.8.

At least another portion of the liquid fraction containing the paraffinic hydrocarbons from separation step d) is advantageously not recycled.

The portion of the liquid fraction containing the paraffinic hydrocarbons from separation step d) which is not recycled in at least one catalytic zone or in a mixture with the flow of total fresh feed F0 upstream of the pre-treatment step, is sent either directly to the gas oil pool, or directly to an optional hydroisomerisation (HIS) section (6), in order to produce high quality kerosene and/or gas oil bases and in particular kerosene bases with good cold properties. In fact, said non-recycled portion of the liquid fraction containing the paraffinic hydrocarbons from separation step d) of the process according to the invention is sufficiently denitrogenated to preserve the catalytic activity of the hydroisomerisation section. A hydrodenitrogenation reactor between the hydrotreatment and the hydroisomerisation is unnecessary.

Hydroisomerisation

According to a preferred implementation, at least a portion of the liquid fraction containing the paraffinic hydrocarbons from separation step d) and not recycled is hydroisomerised in the presence of a hydroisomerisation catalyst. The optional hydroisomerisation step is advantageously implemented under the operating conditions and in the presence of hydroisomerisation catalysts known to a person skilled in the art. The operating conditions and the catalysts used in said hydroisomerisation step are preferably those described in patent FR 2 943 071.

The hydroisomerised effluent then advantageously undergoes at least in part, and preferably in full, one or more separations.

Said separation step(s) can advantageously comprise flash separation to separate the gas from the liquid and/or atmospheric distillation. Preferably, the separation step(s) comprises (comprise) atmospheric distillation. The aim of this step is to separate the gases from the liquid, and in particular to recover the hydrogen-rich gases which may also contain light compounds such as the $C_1$-$C_4$ cut, a gasoline cut (150° C.$^-$) and at least one middle distillates cut (150° C.$^+$) containing kerosene and/or gas oil. Upgrading the gasoline (or naphtha) cut is not the aim of the present invention, but this cut may advantageously be sent to a steam cracking unit for the production of hydrogen or for catalytic reforming The hydrogen produced thereby may be injected into the hydrotreatment and/or optional hydroisomerization step.

The middle distillates cut which represents the desired fuel bases may comprise a cut containing gas oil and kerosene, or the two cuts may be recovered separately. These products are based on renewable sources and do not contain sulphur-containing compounds.

At least a portion of the middle distillate cut or cuts may advantageously be recycled in a hydrotreatment step.

In a variation, at least a portion of the 150° C.+ cut may be recycled to the hydroisomerization step. This fraction thus undergoes isomerisation once again, meaning that cold properties of said fraction can be improved.

In another variation, at least a portion of the 300° C.+ fraction may be recycled in the hydroisomerization step. Thus, this fraction undergoes isomerisation once again, which means that this cut can be upgraded into lighter products and cold properties can be improved.

In another variation, at least a portion of the 150° C.+ cut may be recycled in the hydrotreatment step.

The hydrogen-containing gas which has been separated during the separation step d) of the process according to the invention and/or the optional hydroisomerisation step is, if necessary, advantageously treated at least in part to reduce its light compound content ($C_1$ to $C_4$). Similarly, it advantageously undergoes one or more intermediate purification treatments, preferably at least one wash with at least one amine, preferably followed by methanation and/or separation by pressure swing adsorption (PSA) before being recycled.

Advantageously, recycle hydrogen, preferably purified, may be introduced either with the feed entering the hydrodeoxygenation step according to the invention and/or into the optional hydroisomerization step, or in the form of quench hydrogen between the beds of the hydrodeoxygenation catalysts according to the invention and/or the beds of hydroisomerization catalysts.

It is also advantageous to supplement the recycle gas with a certain quantity of sulphur-containing compound (such as DMDS, dimethyldisulphide), which produces hydrogen sulphide, $H_2S$, upon thermal decomposition. This device can be used if necessary to maintain the catalyst of the hydrotreatment step and/or the optional hydroisomerization step (in the case of an active catalyst in the sulphide form) in the sulphurized condition.

EXAMPLE 1

Not in Accordance with the Invention

In example 1, no pre-treatment step is performed.

The feed to be treated is a part refined jatropha oil, the characteristics of which are shown in Table 1a.

TABLE 1a

| Characteristics of the feed to be treated (semi-refined jatropha oil) | |
|---|---|
| Feed treated | Jatropha oil |
| Density at 15° C. (kg/m³) | 923.5 |
| Oxygen (wt %) | 11.0 |
| Hydrogen (wt %) | 11.4 |
| Sulphur (ppm by weight) | 4 |
| Nitrogen (ppm by weight) | 29 |
| Iodine value (g I2/100 g) | 95 |
| Phosphorous (ppm by weight) | 52 |

TABLE 1a-continued

| Characteristics of the feed to be treated (semi-refined jatropha oil) | |
|---|---|
| Feed treated | Jatropha oil |
| Magnesium (ppm by weight) | 23 |
| Calcium (ppm by weight) | 35 |
| Sodium (ppm by weight) | 8 |

100 g/h (F=Fo) of this feed was to be treated in a hydrotreatment reactor constituted by 3 catalytic beds, without a prior pre-treatment step.

Each catalytic zone was constituted by one bed of catalyst. The catalyst used was identical in the three catalytic zones of the hydrotreatment step and comprised 4% by weight of NiO, 21% by weight of $MoO_3$ and 5% by weight of $P_2O_5$ supported on a gamma alumina. Said catalyst had a Ni/Mo atomic ratio of 0.4.

The supported catalysts were prepared by dry impregnation of the oxide precursors in solution then sulphurized in situ prior to the test, at a temperature of 350° C., using a straight run gas oil feed supplemented with 2% by weight of sulphur from dimethyldisulphide (DMDS). After in situ sulphurization in the unit under pressure, the feed from a renewable source constituted by rapeseed oil described in Table 1a was sent to each of the three catalytic zones.

In order to keep the catalyst in the sulphide state, 50 ppm by weight of sulphur in the form of DMDS was added to the feed. Under the reaction conditions, the DMDS was completely decomposed to form methane and $H_2S$.

The quantity of recycle liquid used and injected with the unrefined feed onto zone Z1 was 100 g/h (R), which resulted in a total mass recycle ratio of 1.0. This recycle was sent in its entirety to the $1^{st}$ catalytic zone Z1 (R1=R and R2=R3=0).

The total operating pressure was 5 MPa relative. Pure hydrogen was mixed with each of the flows of the feed, at a flow rate such that at the inlet to each of the catalytic zones, the $H_2$/unrefined feed ratio was 700 $Nm^3/m^3$.

Table 1b indicates the flow rates for each of the three feed flows, as well as the diluent/feed ratio for each of the 3 catalytic zones.

TABLE 1b

| Operating conditions for the hydrotreatment section/ characteristics of the effluent produced | |
|---|---|
| Feed flow rate, zone Z1 (F1) (g/h) | 9 |
| Feed flow rate, zone Z2 (F2) (g/h) | 36.0 |
| Feed flow rate, zone Z3 (F3) (g/h) | 55.0 |
| Total feed flow rate (F) (g/h) | 100.0 |
| Liquid recycle flow rate (R) (g/h) | 100.0 |
| Total recycle rate R/F (g/g) | 1.0 |
| Local recycle rate, zone Z1 = RF1 (g/g) | 11.1 |
| Local recycle rate, zone Z2 = RF2 (g/g) | 3.0 |
| Local recycle rate, zone Z3 = RF3 (g/g) | 2.6 |
| Inlet temperature, zone Z1 (° C.) | 203 |
| Outlet temperature, zone Z3 (° C.) | 317 |
| Characteristics of the effluent produced | |
| Flow rate of hydrocarbons produced (g/h) | 86.0 |
| Density at 15° C. (kg/m3) | 790 |
| Oxygen (wt %) | <0.2 |
| Nitrogen (ppm by weight) | 5 |

The experiment was carried out in this case by sending the liquid recycle to the inlet of the first hydrotreatment catalytic zone Z1, without pre-treatment step. The hydrocarbon produced, upon leaving the hydrotreatment section, had a significant nitrogen content (5 ppm by weight).

Table 1c shows the change with time in the loss of pressure in the hydrotreatment reactor.

TABLE 1c

| | |
|---|---|
| Loss of pressure at t = 0 (bar relative) | 0.2 |
| Loss of pressure at t = 250 h (bar relative) | 0.5 |
| Loss of pressure at t = 500 h (bar relative) | 2.5 |
| Loss of pressure at t = 750 h (bar relative) | 8.0 |
| Loss of pressure at t = 800 h (bar relative) | 10.2 |

The loss of pressure was measured by the difference in the pressure readings of two gauges arranged at the inlet and the outlet of the bed.

The loss of pressure measured in the hydrotreatment reactor increased continuously during testing until it exceeded a value of 10 bar relative after 800 hours, forcing the test to be interrupted at this point. This increase in loss of pressure was due to the accumulation, in the reactor, of metal deposits from the decomposition of the phospholipids. In an industrial-scale unit this phenomenon would lead to a lower cycle time of the hydrotreatment reactor.

The liquid hydrocarbon produced previously was then injected into a reactor containing 100 cm³ of a hydroisomerisation catalyst, comprising $NiW/SiO_2Al_2O_3$.

The hydrocarbon was injected with a volume flow rate of 100 cm³/g, or a HSV in the hydroisomerisation section of 1.0 h$^{-1}$.

The hydroisomerisation step was performed on a catalyst fixed bed, using a pressure of 5 MPa relative and a temperature of 330° C. and a delivery of pure hydrogen such that the ratio between the volume flow rate of hydrogen and the volume flow rate of liquid hydrocarbon was 700 N m³/m³. At the gas outlets (C4⁻), a naphtha cut (C5-150° C.), and a kerosene cut (150° C.) were obtained. Table 1d shows the characteristics of this kerosene cut, which does not meet the specifications of ASTM D7566 in terms of the atmospheric distillation end point D86 (end point>300° C.), nor the freezing point (−5° C. for a specified value at −40° C. max).

TABLE 1d

| Characteristics of the kerosene cut produced | |
|---|---|
| Density at 15° C. (kg/m3) | 780.1 |
| Starting point D86 (° C.) | 160 |
| End point D86 (° C.) | 305 |
| Nitrogen (ppm by weight) | <0.3 |
| Freezing point (° C.) | −5 |
| Flash point (° C.) | 50 |

EXAMPLE 2

In Accordance with the Invention

The same feed of semi-refined jatropha oil as in the previous example was treated, with an identical feed flow: Fo=F=100 g/h. The catalyst and its preparation were identical to example 1.

The quantity of liquid recycle used, R, was 100 g/h. This recycle was divided into a flow RLC containing the paraffinic hydrocarbons from separation step d), which was sent in its entirety to the first catalytic zone Z1, and the flow rate of which was 80 g/h, and a flow RPP of 20 g/h, which was mixed with the feed flow of rapeseed oil F0. The ratio RPP/F0 was thus 0.2.

The jatropha oil was mixed with the RPP flow in a mixer, and the mixture was heated to a temperature of 180° C. This mixture was introduced into the pre-treatment zone, in which said mixture flowed through 70 cm³ of a fixed bed of spherical alumina having a void fraction of 0.46 with a diameter of between 3 and 6 mm. The alumina had a macroporous volume, measured by mercury intrusion, that is to say a volume of pores whose average diameter was 500 A, equal to 0.35 ml/g, a total porous volume of 1.2 ml/g and a specific surface expressed in $S_{BET}$ of 140 m²/g.

At the end of this pre-treatment step, the perfect separation was performed of a flow F of pre-treated oil, and the flow RPP containing the paraffinic hydrocarbons. Thus ϵ=0. This flow RPP was mixed with the recycle flow RLC sent to the 1$^{st}$ catalytic zone in accordance with configuration (ii) of the process flowsheet.

At the end of the pre-treatment, the characteristics identified of the oil flow F were as shown in Table 2a.

TABLE 2a

| Characteristics of the pre-treated feed (jatropha oil) - Flow F | |
|---|---|
| Feed treated | Jatropha oil |
| Density at 15° C. (kg/m³) | 923.5 |
| Oxygen (wt %) | 11.0 |
| Hydrogen (wt %) | 11.4 |
| Sulphur (ppm by weight) | 3 |
| Nitrogen (ppm by weight) | 13 |
| Phosphorous (ppm by weight) | <1 |
| Calcium (ppm by weight) | <1 |
| Magnesium (ppm by weight) | <1 |
| Sodium (ppm by weight) | <1 |

The pre-treatment allows simultaneous elimination of the phosphorous and the main elements present in the oil (calcium, magnesium and sodium). This step also allows a significant reduction in the nitrogen content of the starting oil, due to the elimination of certain nitrogen compounds (13 ppm instead of 29 ppm initially).

The operating conditions of the hydrotreatment section were identical to those used in example 1.

The total mass recycle rate RT=(RLC+RPP)/F=R/F (configuration (ii)), was identical to example 1 and equal to 1.0, The distribution of the feed across the various catalytic hydrotreatment zones was identical to that adopted in example 1. Table 2b shows the various flow rates and in particular of each of the three flows supplying the catalytic hydrotreatment zones, and the diluant/feed ratios for each of the 3 catalytic zones.

TABLE 2b

| Operating conditions of the hydrotreatment sections and characteristics of the effluent produced | |
|---|---|
| Feed flow rate, zone Z1 (F1) (g/h) | 9.0 |
| Feed flow rate, zone Z2 (F2) (g/h) | 36.0 |
| Feed flow rate, zone Z3 (F3) (g/h) | 55.0 |
| Total feed flow rate (F) (g/h) | 100.0 |
| Liquid recycle flow rate (RLC) (g/h) | 80.0 |
| Liquid recycle flow rate (RPP) (g/h) | 20.0 |
| Total liquid recycle flow rate (R) (g/h) | 100.0 |
| Ratio RPP/Fo (g/g) | 0.2 |
| Ratio RPP/R (g/g) | 0.2 |
| Total liquid recycle rate RT (=R/F) (g/g) | 1.0 |
| Diluent/feed ratio, zone Z1 = (g/g) | 11.1 |
| Diluent/feed ratio, zone Z2 = (g/g) | 3.0 |
| Diluent/feed ratio, zone Z3 = (g/g) | 2.6 |
| Inlet temperature, zone Z1 (° C.) | 203 |
| Outlet temperature, zone Z3 (° C.) | 317 |

TABLE 2b-continued

Operating conditions of the hydrotreatment sections and characteristics of the effluent produced

| Characteristics of the effluent produced | |
|---|---|
| Flow rate of hydrocarbons produced (g/h) | 86.0 |
| Density at 15° C. (kg/m3) | 790 |
| Oxygen (wt %) | <0.2 |
| Nitrogen (ppm by weight) | <0.3 |

Compared with example 1, the pre-treatment section allows a very significant drop in the nitrogen content of the oil flow supplying the hydrotreatment section, and allows a flow of hydrocarbons to be obtained at the outlet that is free from oxygen and nitrogen (nitrogen content of less than the detection limit, or less than 0.3 ppm by weight).

Table 2c shows the change with time in the loss of pressure in the hydrotreatment section.

TABLE 2c

Change with time of the loss of pressure in the hydrotreatment reactor

| | |
|---|---|
| Loss of pressure at t = 0 (bar relative) | 0.3 |
| Loss of pressure at t = 250 h (bar relative) | 0.4 |
| Loss of pressure at t = 500 h (bar relative) | 0.4 |
| Loss of pressure at t = 750 h (bar relative) | 0.4 |
| Loss of pressure at t = 800 h (bar relative) | 0.4 |

The loss of pressure was measured in the same way as for example 1.

During the 800 hours during which the hydrotreatment test was running, no significant increase in the loss of pressure in the reactor was observed. This was due to the fact that the flow of oil supplying the reactor was free from metals, thereby eliminating the progressive clogging of the reactor through the accumulation of solid metal deposits.

This hydrocarbon was then treated in a hydroisomerisation reactor and under operating conditions that were strictly identical to those described in example 1. At the gas outlet (C4$^-$), a naphtha cut (C5-150° C.), and a kerosene cut (150° C.$^+$) were then obtained.

Table 2d shows the characteristics of the kerosene cut produced under these conditions.

TABLE 2d

Characteristics of the kerosene cut produced

| | |
|---|---|
| Density at 15° C. (kg/m3) | 764.5 |
| Starting point D86 (° C.) | 160 |
| End point 86 (° C.) | 295 |
| Nitrogen (ppm by weight) | <0.3 |
| Freezing point (° C.) | −50 |
| Flash point (° C.) | 50 |

It can be seen that the freezing point of the kerosene cut produced according to the present invention meets the ASTM D7566 specifications requiring a freezing point of −40° C. max.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein of and corresponding French application No. 11/03411, filed Nov. 8, 2011, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for the hydrotreatment of a feed originating from renewable sources in order to produce paraffinic hydrocarbons comprising:
   a) mixing a total feed flow F0 with a flow RPP comprising at least a portion of a liquid fraction R containing paraffinic hydrocarbons from the separation d), said mixture being heated to a temperature of between 130 and 320° C.;
   b) introducing said mixture into a pre-treatment zone in which flow of said mixture takes place via a porous medium comprising a fixed particle bed, said fixed bed having a void fraction of between 0.25 and 0.8;
   c) hydrotreating effluent from the pretreatment zone in the presence of hydrogen in excess of theoretical hydrogen consumption and under hydrotreatment conditions in a fixed bed reactor having a plurality of catalytic zones disposed in series and comprising a hydrotreatment catalyst, by dividing effluent resulting from the pre-treatment zone (F+εRPP), ε being between 0 and 1, into at least a certain number of different part flows (F1+ε$_1$RPP) to (Fn+ε$_n$RPP) equal to the number of catalytic zones n in a fixed bed reactor, injecting a first part flow (F1+ε$_1$RPP) into a first catalytic zone, injecting a second part flow (F2+ε$_2$RPP) into the second catalytic zone and so on, if n greater than 2, the sum of the ε$_i$ being equal to ε; the various part flows are injected into successive catalytic zones in increasing proportions such that F1/F is less than or equal to F2/F, which itself is less than or equal to F3/F and so on until F(n-1)/F is less than or equal to Fn/F, in order to produce an effluent containing paraffinic hydrocarbons;
   d) subjecting said effluent containing paraffinic hydrocarbons to at least one separation allowing separation of at least one gaseous fraction and at least one liquid fraction containing the paraffinic hydrocarbons;
   e) dividing at least a portion R of said liquid fraction containing the paraffinic hydrocarbons from b) mixing RPP into at least a flow RLC and into said recycle flow RPP upstream of a) and with the total feed flow F0, dividing said flow RLC into at least a certain number of different part flows R1-Rn less than or equal to the number of catalytic zones n in the reactor, said flows R1-Rn being recycled upstream of the catalytic zones 1-n, the flow of paraffinic hydrocarbons (R1+ε$_1$RPP) sent to the first catalytic zone and the part flow F1 of the feed introduced into the first catalytic zone having a weight ratio greater than or equal to 10.

2. The process according to claim 1 in which said feed originating from renewable sources is oils or fats of vegetable or animal origin or mixtures thereof, containing triglycerides and/or free fatty acids and/or esters.

3. The process according to claim 1 wherein the flow RPP introduced in a) in relation to the flow of total fresh feed F0 has a mass flow ratio RPP/F0 between 0.1 and 5.

4. The process according to claim 3 in which the mass flow ratio RPP/F0 is between 0.5 and 3.

5. The process according to claim 1 in which catalyst particles in the fixed bed are materials with a specific surface of between 0.5 and 320m²/g.

6. The process according to claim 5 in which said particles are porous refractory oxides, oxide ceramics, non-oxide ceramics, composite ceramics, silicon carbides, activated carbons, calcium aluminates, metals or graphite.

7. The process according to claim 6 in which said particles are porous refractory oxides that are alumina, silica, activated alumina, silica-aluminas, metal oxides or non-metal oxides.

8. The process according to claim 1 in which the effluent from the pre-treatment zone (F+εRPP) is introduced into a separation zone in order to separate a paraffin-rich effluent (1-ε) RPP.

9. The process according to claim 1 having a in which the total recycle rate (RT)less than 1.0.

10. The process according to claim 1 wherein the flow RPP is introduced into a) in relation to the total recycle flow R at a mass flow RPP/R ratio between 0.1 and 0.9.

11. The process according to claim 1 in which said feed originating from renewable sources is treated in a mixture with oil cuts that are gas oils, kerosenes or gasolines from oil refining processes.

12. The process according to claim 1 in which at least a portion of the liquid fraction containing the paraffinic hydrocarbons from separation d) not recycled is hydroisomerized in the presence of a hydroisomerization catalyst.

\* \* \* \* \*